UNITED STATES PATENT OFFICE.

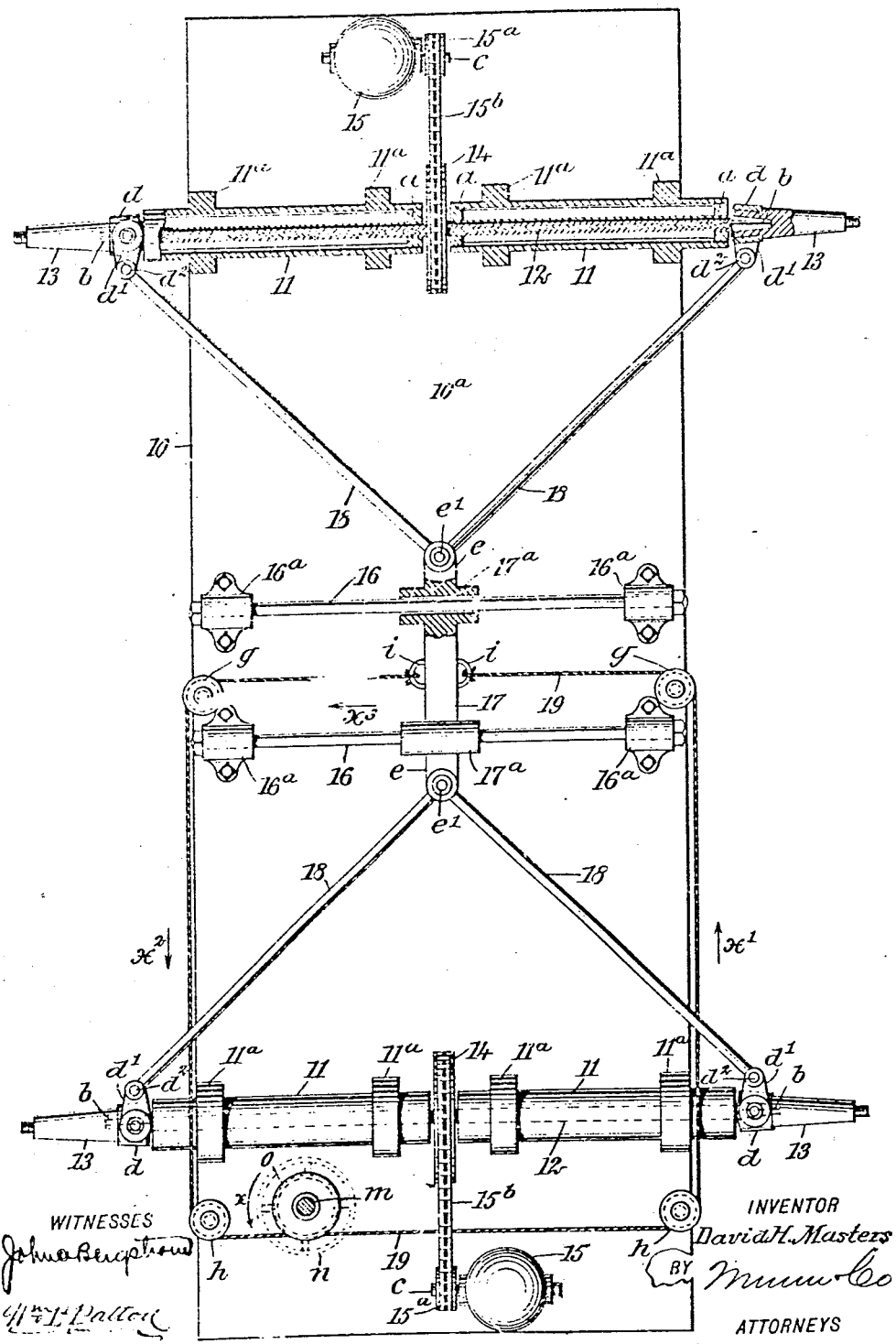

DAVID HALL MASTERS, OF CLIFF, TERRITORY OF NEW MEXICO, ASSIGNOR OF ONE-HALF TO ARTHUR L. CLARK, OF CLIFF, TERRITORY OF NEW MEXICO.

RUNNING-GEAR FOR VEHICLES.

957,075.

Specification of Letters Patent.

Patented May 3, 1910.

Application filed September 9, 1908. Serial No. 452,222.

*To all whom it may concern:*

Be it known that I, DAVID H. MASTERS, a citizen of the United States, and a resident of Cliff, in the county of Grant and Territory of New Mexico, have invented a new and Improved Running-Gear for Vehicles, of which the following is a full, clear, and exact description.

The purpose of my invention is to provide novel details of construction for the running gears of a vehicle, and more particularly for an automobile, which adapt said gears to reliably coöperate, for swinging the ends of both axles simultaneously an equal degree, toward each other at one side of the vehicle, and correspondingly diverging their opposite ends at the other side thereof, whereby full control of the turning movement of the vehicle toward either side thereof is insured, and danger due to loss of control is avoided.

The invention consists in the novel construction and combination of parts, as is hereinafter described, and defined in the appended claims.

Reference is to be had to the drawing that forms a part of this specification, and to the characters of reference thereon, the view shown being a reversed plan of an automobile body, and a partly sectional plan view of the improved running gears mounted thereon.

The chassis or body 10 of the vehicle, is of the usual form having greater length than width, and parallel sides thereon, the framing of the bottom being concealed by a wooden or other covering, whereon the running gears are secured in proper relative positions as will now be described.

At a suitable distance from each end of the body 10, two tubular bolsters are secured, said bolsters each consisting of two half sections 11, that are mounted upon blocks 11ª, which have contact with and are secured to the bottom 10ª of the body 10, said blocks being spaced apart so as to afford a proper connection between the bolsters and bottom of the vehicle.

In each pair of alined tubular bolsters 11, a strong but flexible axle body 12 is centrally supported and rotatably secured by its loose engagement within perforated plugs or end walls *a* that constitute bearings and that are inserted and secured in the ends of the bolster sections, as shown for one pair thereof in the drawings.

The ends *b* of the flexible axles 12, are extended outside of respective ends of the bolster sections 11 and upon each shank or end *b* a preferably coniform spindle 13, is mounted and secured, each spindle having an axial socket formed therein, which extends from the larger end thereof and is thus adapted for the reception of a respective shank end of an axle 12, the axles and spindles rotating together when actuated by means that will be described. The spindles 13 are each designed to receive a pneumatic tired or other style of vehicle wheel, and retain the same in secured engagement therewith, said wheels being omitted from the drawings, as they are not necessary for an illustration of the invention.

Centrally upon each flexible axle 12, a sprocket gear wheel 14 is mounted and secured, said wheels being respectively positioned between spaced adjacent ends of the paired bolster sections 11.

Upon each end portion of the vehicle bottom 10ª, a motor 15, is secured, having a driving shaft *c*, whereon a sprocket pinion 15ª is secured, in the same vertical plane with the gear 14, and said gear and pinion for each axle 12, are operatively connected with each other by a sprocket chain 15ᵇ, and it is to be understood that each axle 12, by its geared connection with a respective motor, receives rotary motion therefrom in the same direction, either to propel the vehicle forward or rearward.

Upon the bottom wall 10ª of the vehicle, two guide rods 16, are mounted and spaced therefrom in parallel planes, by bracket blocks 16ª, that are secured upon the bottom wall, and are clamped upon the guide rods at their ends.

A cross head 17, having tubular boxes 17ª on its ends, is slidably mounted upon the guide rods by a loose engagement therewith of respective boxes, as shown in the drawings, whereby the cross head is adapted for a free sliding movement longitudinally of the guide rods in either direction.

A collar $d$ is loosely mounted but held from lateral displacement on each spindle 13, at the end nearest to the respective end of a bolster section 11, and upon each collar an ear $d'$ is formed or secured, said ears in pairs projecting toward a respective guide rod 16, when arranged for service. At each end of the cross head 17, a joint leaf $e$ is formed, that respectively project from the boxes $17^a$.

Each leaf $e$ is jointed as at $e'$ upon the lapped ends of two similar link bars 18, that diverge toward opposite ends thereof, which are lapped and pivoted upon respective ears $d'$, as indicated at $d^2$ in the drawings.

It will be noted in the drawings, that when the cross head 17, is positioned at the transverse center of the bottom wall $10^a$, the axles 12 and spindles 13 thereon, are disposed in parallel planes at right angles with a longitudinal center line of the vehicle body 10.

Between the guide rods 16, and near the sides of the vehicle body, two grooved pulleys $g$ are respectively pivoted upon the bottom wall $10^a$. Upon said bottom wall preferably near the forward end thereof, two grooved pulleys $h$ similar to the pulleys $g$ are pivoted near opposite edges of said bottom wall $10^a$. Oppositely upon the cross head 17, near its center, two metal loops $i$ project outwardly. At a convenient point, preferably intermediate the forward grooved pulleys $h$, a steering shaft $m$ is rotatably supported, which extends below the bottom wall $10^a$.

Upon the upper end of the shaft $m$, a steering wheel $n$ is mounted which is shown in dotted lines in the drawings, and upon a portion of said shaft which extends below the bottom wall $10^a$ a grooved drum $o$ is mounted and secured.

A flexible connection 19, is secured by one end to one of the loops $i$ and from said loop is extended outward into an engagement with the grooved pulley $g$ at the left side of the drawing. From said pulley, the flexible connection 19, is drawn forward, and passed around the forward pulley $h$ at the left side of the drawing, thence the flexible connection is drawn transversely and passed around the grooved drum, and thence to the next forward grooved pulley $h$, from which said flexible connection is drawn in taut condition rearward, and engaged with the grooved periphery of the pulley $g$ at the right side edge of the bottom $10^a$ and thence is passed through the remaining loop $i$ and thereto secured.

It will be seen that when the vehicle is reversed or turned right side up and mounted upon its wheels, if the hand wheel $n$ is turned in one direction, say toward the right side of the body 10, as is indicated by the curved arrow $x$, the pull on the flexible connection 19, will be in the direction indicated by the straight arrows $x'$ $x^2$.

The operation of the hand wheel as stated, will cause the cross head 17 to move in the direction of the straight arrow $x^3$, or toward the left side of the vehicle. This adjustment of the cross head, will spread apart the spindles 13, at the left side of the vehicle, and correspondingly draw the spindles at the other or right side thereof toward each other, which will cause the running gears to turn the vehicle toward the right side of the same.

It will be noted that as the length of the link bars 18 is equal, the rocking movement of the spindles 13, at one side of the vehicle will be in a direction directly opposite, and equal in degree, so that the spindles on each axle are alined at any degree of inclination laterally that may be given thereto.

As the axles 12 are measurably flexible, it will be obvious that they will bend at their shanks sufficiently for a proper lateral rocking movement of the spindles 13, their resilience serving to assist the return of the cross head to a normal central position on the guide rods when the hand wheel is released from hand pressure.

It is claimed for this improvement that all parts are strong and durable, that the gears are extremely simple, that full control is afforded and contingency of accidents reduced, and that the cost of production and maintenance in repair are reduced to a minimum. Furthermore, it will be noted that the novel construction of parts gives the one who is running the automobile full control of the running gears, which will enable the machine to be run forward, backward or turned at either end toward either side as the circumstances may require.

Having thus described my invention, I claim as new and desire to secure by Letters Patent:

1. The combination with a vehicle body, of a flexible axle in bar form and supporting the body, spindles on the ends of the axle, and means engaging the axle for its rotation.

2. The combination with a vehicle body, of a hollow bolster on the bottom of said body near each end thereof, each bolster being formed in half sections that are alined with each other, a flexible axle rotatable in each bolster, said axle being in bar form and having shank-ends projected therefrom, independent means for rotating each axle, spindles secured on said shanks and adapted by resilience of the axles to receive lateral rocking movement, and means for the manual control of the movement of the spindles.

3. In running gears for motor vehicles, the combination with a body, of a sectional bolster secured to the under side of the body with the inner ends of the sections spaced a short distance from each other, a rotatable flexible axle in bar form in the bolster and having shank ends, spindles secured to the shank ends, a sprocket gear wheel secured on the axle between the inner ends of the sections of the bolster, a motor, a sprocket wheel on the driving shaft of the motor, and a chain connecting the said gear wheel and pinion.

In testimony whereof I have signed my name to this specification in the presence of two subscribing witnesses.

DAVID HALL MASTERS.

Witnesses:
E. N. HALPIN,
L. R. TANNER.